(12) United States Patent
Henon

(10) Patent No.: US 6,577,717 B1
(45) Date of Patent: Jun. 10, 2003

(54) BROADCASTING OF DIFFERENT TARIFF PERIODS IN A TELEPHONE SYSTEM

(75) Inventor: Alexandre Henon, Newark, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/320,810

(22) Filed: May 27, 1999

(51) Int. Cl.[7] .................. H04M 15/00; H04M 11/00
(52) U.S. Cl. .................. 379/114.01; 379/114.02; 379/114.13; 379/114.03; 379/130; 455/406; 455/407
(58) Field of Search .................. 379/111, 112, 379/113, 114, 115, 130, 114.01, 114.02, 114.05, 114.06, 114.13; 455/407, 408, 412, 421, 466, 38.4, 406, 67.1

(56) References Cited

U.S. PATENT DOCUMENTS

| | | | | |
|---|---|---|---|---|
| 5,303,297 A | * | 4/1994 | Hillis | 379/114.01 |
| 5,659,601 A | | 8/1997 | Cheslog | 455/406 |
| 5,794,140 A | * | 8/1998 | Sawyer | 455/406 |
| 5,848,138 A | * | 12/1998 | Sarpola et al. | 379/114 |
| 5,862,203 A | * | 1/1999 | Wulkan et al. | 379/114 |
| 5,862,471 A | * | 1/1999 | Tiedemann, Jr. et al. | 455/406 |
| 5,915,005 A | * | 6/1999 | He | 379/115 |
| 5,930,343 A | * | 7/1999 | Vasquez | 379/115 |
| 5,970,403 A | * | 10/1999 | Alperovich et al. | 455/406 |
| 5,974,308 A | * | 10/1999 | Vedel | 455/407 |
| 6,002,755 A | * | 12/1999 | Krank et al. | 379/130 |
| 6,009,154 A | * | 12/1999 | Ricken et al. | 379/114 |
| 6,052,575 A | * | 4/2000 | Lahdemaki et al. | 455/407 |
| 6,078,652 A | * | 6/2000 | Barak | 379/115 |
| 6,125,173 A | * | 9/2000 | Jagadish et al. | 379/114.01 |
| 6,347,224 B1 | * | 2/2002 | Smyth et al. | 455/406 |

FOREIGN PATENT DOCUMENTS

| | | | | |
|---|---|---|---|---|
| DE | 3305978 A1 | 8/1984 | | H04M/15/00 |
| WO | 95/20298 | 7/1995 | | H04Q/7/22 |
| WO | 96/20571 | 7/1996 | | H04Q/7/22 |

* cited by examiner

Primary Examiner—Melur Ramakrishnaiah
Assistant Examiner—Quoc Tran
(74) Attorney, Agent, or Firm—Gwenaelle Le Pennec

(57) ABSTRACT

Broadcasting of different tariff periods in a telephone system. Subscribers of a telecommunication system are advised of service charging tariffs of services to said subscribers. In the telecommunication system, a service charging tariff message is sent to subscriber stations operated by the subscribers. The service charging tariff message comprises a starting time of a future tariff period and a tariff indication of the future tariff period. A subscriber station receiving such a service charging tariff message processes the starting time and the tariff indication. The service charging tariff information is stored and retrieved, and is displayed on a display of the subscriber station. The tariff indication comprises an early indication of off-peak time charge free minutes, usually forming part of a calling plan of a subscriber, which off-peak time free charge minutes can be spent during peak time.

19 Claims, 3 Drawing Sheets

BROADCASTING OF DIFFERENT TARIFF PERIODS IN A TELEPHONE SYSTEM

BACKGROUND OF THE INVENTION

1. Field of the Invention

The present invention relates to a method for advising subscribers of a telecommunication system of service charging tariffs of services to subscribers. The present invention further relates to a subscriber station processing such a service charging tariff advice. The telecommunication system can be: a wired or wireless system. The service can be a voice service or a data service.

2. Description of the Related Art

In the German Patent Application No. 33 05 978 A1, a telecommunication system is disclosed in which traffic peaks are smoothed by signaling to subscriber stations of a currently valid charging tariff corresponding to an each time momentary traffic situation, so that a subscriber can consider the importance of a desired call against the momentary costs of such a call. Particularly, a tariff signal is transmitted to a subscriber for whom a connection setup was initiated, the tariff signal indicating a charging tariff corresponding to a current network load. In the latter case, when the subscriber breaks off the call setup, not all otherwise, necessary network resources have to be allocated that would be necessary to complete the call setup and the call. The current charging tariff can be signaled by the system to the individual subscriber stations at regular intervals, e.g., in case of an ISDN network, in the ISDN signaling channel of the subscriber station. The subscriber can also request the current charging tariff from the system before actually making a call. The tariff signal can be transmitted in a coded way so that the current charging tariff can be displayed at a subscriber station's display. It is further disclosed that a microprocessor in the subscriber station can be programmed such that desired calls are first stored in a microprocessor memory and that such calls are automatically dialed if a favorable currently valid charging tariff signal is received by the subscriber station. Although in the disclosed in the German Patent Application No. 33 05 978 A1, smoothing of traffic peaks is obtained, the disclosed smoothing method provides uncertainties as regards considerations when to make telephone call at favorable costs. Furthermore, in the case of a microprocessor automatically setting up a call upon reception of a favorable currently valid charging tariff, such an automatic call setup provides inconveniences to the subscriber in that the subscriber might not be available to make a call at that particular time or is doing something else and does not want to be disturbed.

In the PCT Application WO 95/20298, a method for transmitting of changing tariff data in tariff frames to a subscriber station is disclosed, during a telephone call. In this method, upon call setup a subscriber of a pay phone is informed about a current charging tariff, and is further given a lump sum for that call that counts down in accordance with the current charging tariff until it is consumed. If the call still is not finished, in a further tariff frame, a further lump sum will be provided against a then valid current charging tariff, the previous and the then valid current charging tariff possibly being different. In this method, the system operator tries to achieve a tariff situation both favorable to the operator and the subscriber. As the German Patent Application No. 33 05 978, this method is not very convenient to the subscriber either as to when to make telephone calls at favorable costs.

In the PCT Application WO 94/28670, a method for indicating the charge of a call in a telecommunication network is disclosed. The indication of the charge of the call is provided to the user upon initial call setup, without the network allocating all resources needed to completely set up a call and to complete a call. The initial call set up will only be finished when the user gives permission to do so. So, also this advice-of-charge service is inconvenient to the user as to when to make telephone calls at favorable costs.

In the PCT Application WO 96/20571, charging criteria are disclosed used in a mobile telephone network for determining a price for a call between two subscribers. It is disclosed that charging of mobile radio subscribers is different from charging of wired network subscribers. It is described how the cost of a call is divided over the calling and the called party, depending on the roaming situation of the two subscribers in the mobile telephone network. It is further disclosed that in the mobile radio network a lower tariff may be applied during so-called off-peak times, and a higher tariff than normally during peak times.

In the U.S. Pat. No. 5,659,601, a mobile radio system is disclosed in which actual peak and off-peak usage information, as well as billing information such as customer discounts is used by the system to provide rate plan analysis for alternative rate structures.

So, both the PCT Application WO 96/20571 and the U.S. Pat. No. 5,659,601 disclosed application of off-peak and peak rates as such, by a mobile telephone operator. Off-peak periods are usually part of a service plan, and are typically offered from 7 PM to 7 AM, or a similar period, and during weekends, i.e., offer no flexibility to the network operator or subscribers.

SUMMARY OF THE INVENTION

It is an object of the invention to provide a method for flexibly advising subscribers of a telecommunication system of varying service charging tariffs over a time period, such that peak traffic in the telecommunication is smoothed.

It is another object of the invention to provide such a method wherein an operator can optimize its revenues, taking into account service plans of subscribers that include free off-peak minutes.

It is still another object of the invention to provide a subscriber station processing received service charging tariff messages broadcast in accordance with said message.

It is still another object of the invention to provide such a subscriber station provided with a user-friendly user interface for presenting received service charging tariff information.

In accordance with the invention, a method for advising subscribers of a telecommunication system of service charging tariffs of services to said subscribers is provided, said method comprising:

broadcasting of a service charging tariff message from said telecommunication system to said subscribers, said service charging tariff message comprising a starting time of a future tariff period and a tariff indication of said future tariff period;

upon reception of said service charging tariff message, processing of said starting time of said future tariff period and said tariff.

An advantage for the subscriber, such as a mobile phone subscriber who has usually many off-peak free minutes in his or her calling plan, is that such free off-peak minutes can be spent more flexible. Without an operator offering off-peak periods outside a usually fixed period, e.g. between 7 PM and 7 AM, the subscriber could only spend free minutes within such a fixed period. An advantage for the operator of the telecommunication system is that revenues can be improved. This is based on the idea that if subscribers spend more free minutes outside said fixed periods, such subscribers will quite likely also spend air-time within such fixed periods, even when all free minutes are spent. This is because usually within such fixed periods tariffs are lower than outside such fixed and usually more peak-like hours. Operators usually perform call behavior analysis and measure traffic intensities so that they can easily offer cheaper call periods outside said fixed cheaper periods, taking into account such analysis and measurements. The calling plan can also include a reduced charging tariff for off-peak minutes. Then, the tariff indication can indicate such a reduced charging tariff so that the subscriber can spend its reduced charging tariff minutes during peak times as indicated in the service charging tariff message.

Advantageously, also an ending time of said future tariff period is offered so that the subscriber is fully informed about occasional off-peak charging rates during peak periods, and can thus better plan its calls, considering the importance of a call and the costs of a call.

The operator can broadcast information about future tariff periods on a piecemeal-by-piecemeal basis, which has the advantage for the operator of some uncertainty at the side of the subscriber, thereby avoiding that too many subscribers avail themselves, of the tariff option. The operator can also decide to broadcast information about several future tariff periods at the same time, thereby improving the service to its subscribers, the tariff information including information related to the same day or even later days.

The operator can also provide successive messages throughout the day with only starting times of future tariff periods with different tariffs, such as indicating at a particular time of the day outside fixed off-peak periods that an off-peak period starts or that peak-period starts or resumes.

In an embodiment of the invention the subscriber station has a user-friendly interface for processing received service charging tariff information. In such a user-friendly interface service charging information is displayed in the form of an icon, such as a triangle, or a bar chart, or the like reflecting different tariff periods and tariffs throughout the day. Herewith, the subscriber has a convenient means to decide whether to immediate place a call, possibly against higher costs, or, based on the displayed information, to postpone a call to a later time.

In another embodiment, the information contained in the service charging tariff message is in the form of a free format alpha-numerical message.

DESCRIPTION OF THE PREFERRED EMBODIMENT

Figure 1:
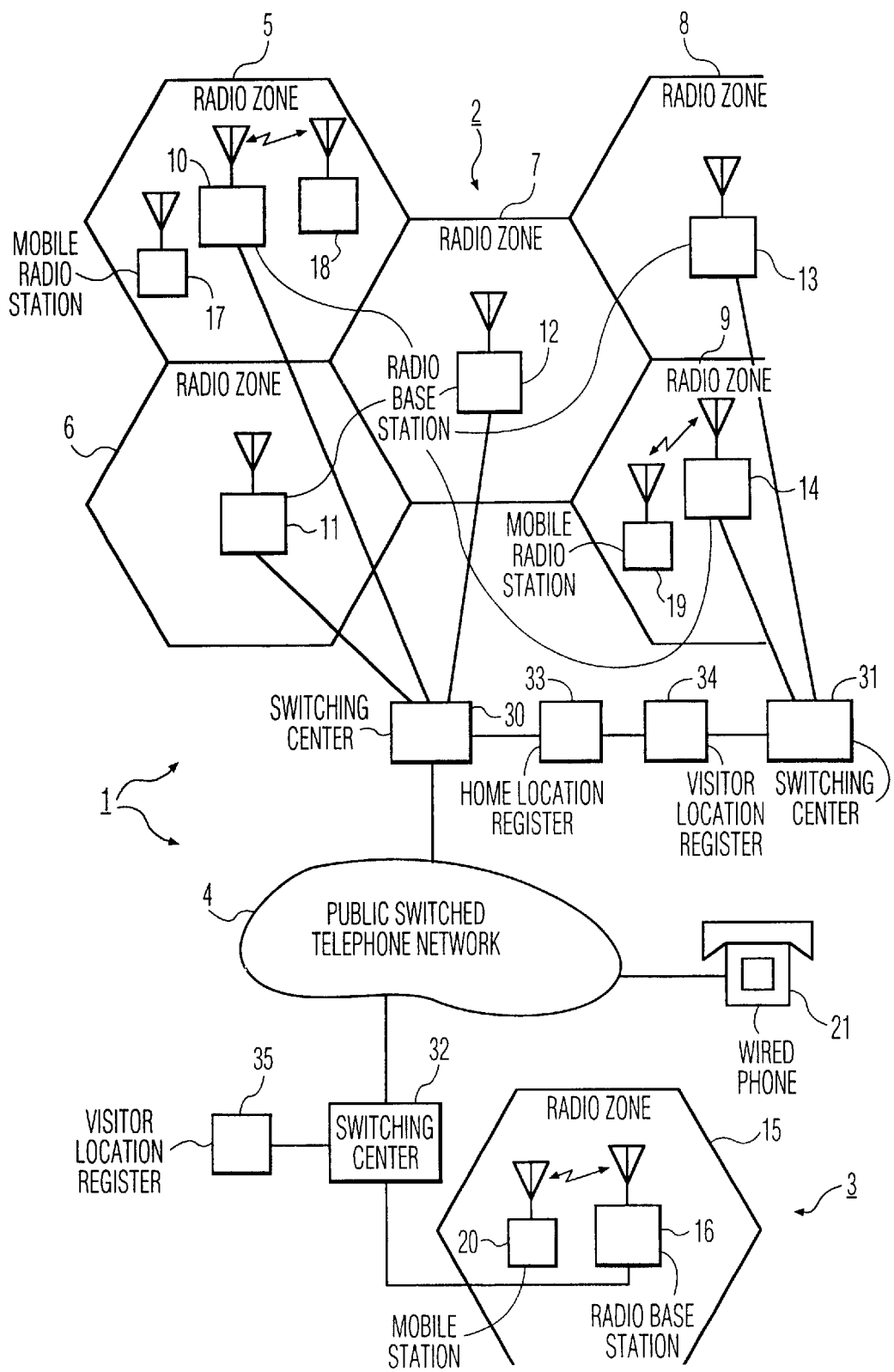
FIG. 1 schematically shows a telecommunication system.

FIG. 1 schematically shows a telecommunication system 1 comprising a first cellular radio network 2, a second cellular radio network 3, and a public switched telephone network (PSTN) 4. The first cellular radio network 2 comprises a number of radio zones 5, 6, 7, 8, and 9 with respective radio base stations 10, 11, 12, 13, and 14. The second cellular radio network comprises a radio zone 15 with a radio base station 16. Further shown are subscriber stations, a mobile radio 17 and a mobile radio station 18 in the radio zone 5, a mobile radio station 19 in the radio zone 9, a mobile radio station 20 in the radio zone 15, and a wired telephone 21 of the network 4. In the first cellular radio network 3, the radio base stations 10, 11, and 12 are coupled to a switching center 30, and the radio base stations 13 and 14 are coupled to a switching center 31. In the second cellular radio network 3, the radio base station 16 is coupled to a switching center 32. The switching centers 30 and 32 are gates to the public switched telephone network 4. The switching centers 30, 31, and 32 are coupled to a so-called home and visitor location registers 33, 34, and 35. Upon registration of a mobile radio station to a cellular radio network, registration data are stored by the cellular network operator in a home location register. When a mobile radio station roams through a cellular network, a part of its registration data is copied in a visitor location register. In the shown telecommunication network, mobile radio stations are allowed to roam from the first cellular radio network 2 to the second cellular radio network 3. The networks 2 and 3 may partly overlap or be geographically distinct networks. Depending on an actual geographical location of a mobile radio station, a network operator charges a particular service charging tariff. In addition to a basic service that applies for a mobile radio stations in their home location area, e.g. formed by the area covered by the radio base stations 10, 11, and 12, a network operator usually charges so-called roaming charges. Particularly, when a mobile radio station roams from its home operator to a visitor operator, higher such a visitor operator charges higher service tariffs. The computation of service charging tariffs as such, by operators of cellular or wired networks, for voice or data communication, is known in the art. Usually, network operators offer their subscribers a particular calling plan, with lower tariffs for home calls and higher tariffs otherwise. Also, operators apply tariff differentiation for peak and off-peak hours, with lower tariffs for calls made during off-peak hours. Typically, off-peak hours are from 7 PM to 7 AM during the week, and during the weekend. In addition thereto, such calling plans usually comprise off-peak charge free minutes, e.g. sixty off-peak charge free minutes per months. After a subscriber has spent his monthly off-peak charge free minutes, during off-peak periods the off-peak service charging tariff is charged. In accordance with the invention, an even more flexible charging of service charging tariffs is offered. Particularly, a method is described how to influence the calling behavior of a subscriber such that peak hour traffic is smoothed. Such a calling behavior is particularly changed by offering off-peak charge free minutes during peak hours, but also otherwise, by offering lower tariffs during peak hours. In this respect, it is essential that subscribers are informed in advance of such off-peak charge free minutes during peak hours, and of reduced service charging tariffs, particularly during peak hours. The present invention herewith distinguishes over prior art advice-of-charge methods in which a subscriber is only informed about current charges, either on a call-by-call basis or on a broadcast-basis.

Figure 2:
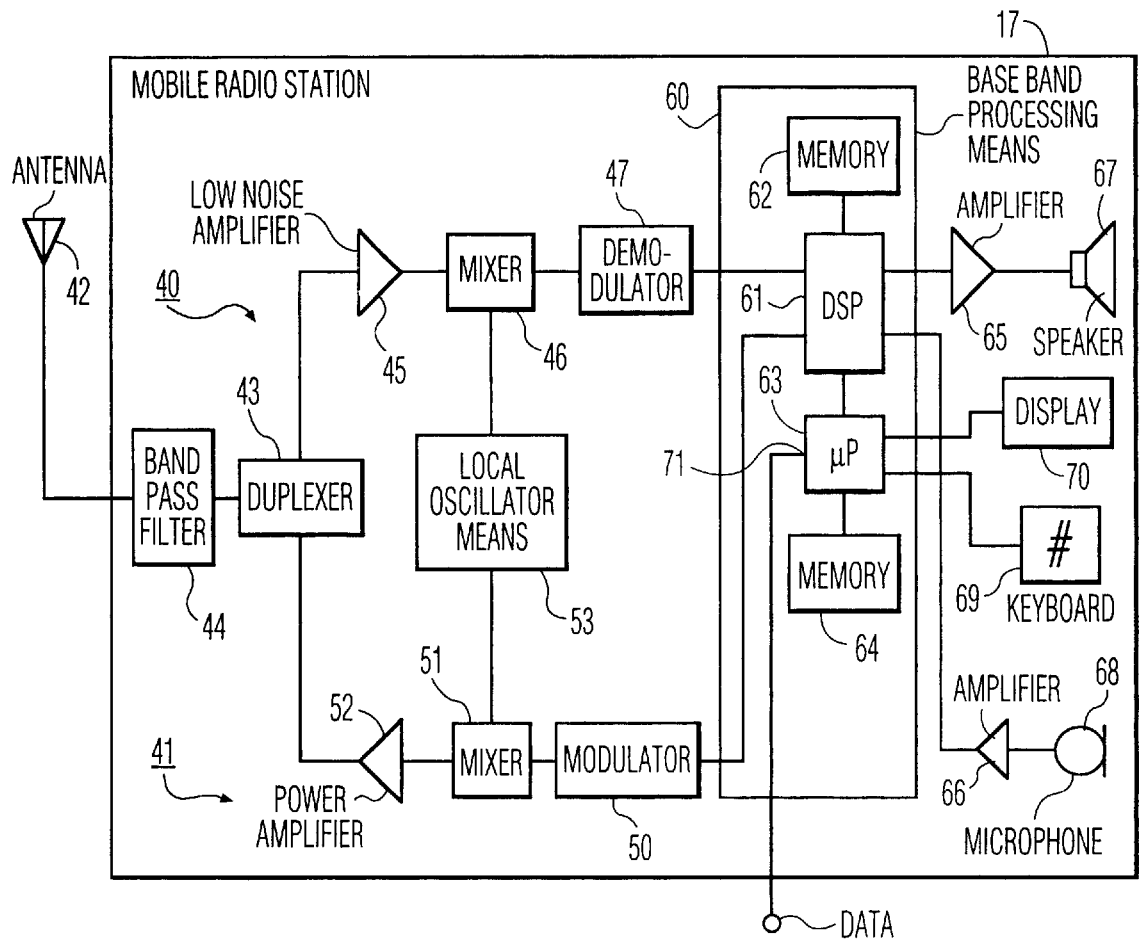
FIG. 2 is a block diagram of a subscriber station for use in the telecommunication system.

FIG. 2 is a block diagram of the subscriber station 17 for use in the telecommunication system 1. The mobile radio station 17 comprises a receiver branch 40 and a transmitter branch 41, the receiver and transmitter branches 40 and 41 being coupled to an antenna 42 via a duplexer 43 and a band pass filter 44. The receiver branch 40 comprises a low noise amplifier 45, coupled to a frequency down-conversion stage or mixer 46 which is followed by a demodulator 47. The mobile radio station 17 can be a station for use in an analog mobile radio system, or a digital mobile radio system such as GSM, IS-136, PDC, or the like, a an FD/TDMA or spread spectrum system or hybrid system. The invention can also be used in wired systems or mixed wired/wireless systems. In case of a digital system, the demodulator or detector 47 provides binary symbols or digits. The transmitter branch 41 comprises a modulator 50 that is coupled to a frequency up-converter or mixer 51. The mixer 51 is coupled to the duplexer 43 via a power amplifier 52. A local oscillator means 53 is coupled to the mixers 46 and 51. The receiver and transmitter branches 40 and 41 are further coupled to base band processing means 60 comprising a digital signal processor (DSP) 61 coupled to a RAM/ROM-memory 62, and further a microprocessor ($\mu$P) 63 coupled to a RAM/ROM-memory 64. The DSP 61 is coupled to the demodulator 47 and to the modulator 50, and further to amplifiers 65 and 66. The amplifier 65 provides a speech or voice signal to a speaker 67, and the amplifier 66 is coupled to a microphone 68 that picks up a voice signal of a mobile radio subscriber using the mobile radio station 17. The microprocessor 63 is coupled to a keyboard or keypad 69, and to a display 70. The keyboard or keypad 69 comprises number keys and control or function keys, and possibly alpha-keys. Such a keyboard or keypad (of which no individual keys are shown) is well known per se. The microprocessor 63 further comprises an input 71 for data. Such an input can be a PCMCIA-input so that the mobile radio station can easily be coupled to a laptop computer, a PDA-device, a Fax-device, or the like. The data can also be generated and retrieved by the mobile radio station itself. The ROM-parts of the RAM/ROM-memories 62 and 64 are suitably programmed so as to operate the mobile radio station 17 for voice and/or data communication, and to control the keyboard and display 69 and 70. In accordance with present state of the art mobile radio stations, the programs are so-called menu-driven.

Figure 3:
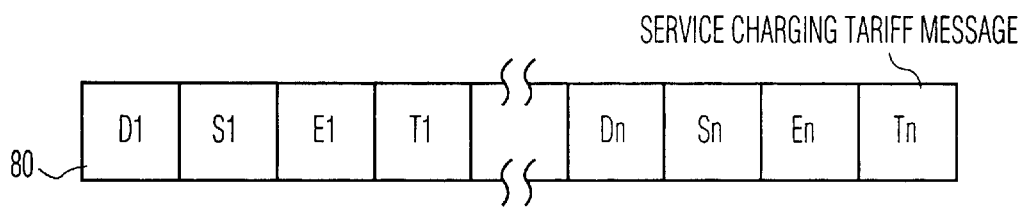
FIG. 3 is a service charging tariff message according to the present invention.

FIG. 3 is a service charging tariff message 80 according to the present invention. The service charging tariff message 80 is broadcast by an operator of the telecommunication system 1 to subscriber stations such as the mobile radio station 17, preferably in a rather unpredictable way. The service charging tariff message 80 comprises future service charging tariff information, for a current day or even for following days. Such information can be in the form of a starting time of a future tariff period and a tariff indication only. Then, the tariff indication can be a percentage of a peak time tariff, or a tariff type indication such as regional or local tariff and an absolute charging amount. The tariff indication can also be an indication of the type: "Peak time starting at", or "Off-peak free minute period starting at". In addition thereto, the message 80 can comprise an ending time of a future tariff period so that a subscriber is more certain about the length of a particular tariff period. The message 80 as shown in FIG. 3 comprises several future tariff periods, a period starting at day D1, with starting and ending times S1 and E1, and tariff indication T1, until a period starting at Dn, with starting and ending times Sn and En, and tariff indication Tn, n being an integer. The date-fields D1, . . . , Dn can be omitted. In that case, all tariff information applies to the current day. In addition thereto, the ending times E1, . . . , En can be omitted. In that case, a subscriber still knows in advance that a particular tariff period will start, such as an off-peak free minute period, but has might reasonably assume that for voice communications a tariff period at least is five minutes or so. An operator might adopt a policy to make available short cheap periods for data traffic, with a duration of even less than five minutes. The tariff indications T1 and T2 can also include the type of traffic, voice or data traffic. The message 80 can also be broadcast in the form of a free-format alphanumeric message such as "Peak time is starting at 1:00 PM", "An off-peak free minute period is starting at 6:00 PM". Such free-format messages then indicate a future change of tariff, i.e., indicate that a current off-peak free minute period will be followed by a peak-time period starting at 1:00 PM, or that a current peak-time period will be followed by an off-peak free minute period at 6:00 PM, for instance instead of charge free off-peak minutes, a calling plan might include a reduced charging tariff for regular off-peak minutes. In accordance with the invention, the tariff indication which is broadcast in the service charging tariff message can indicate such a reduced charging tariff, so that, during time periods chosen by the operator, reduced regular off-peak charging tariff minutes in the calling plan can be consumed during peak hours. In systems such as GSM, the tariff information can be broadcast in System Information Type Messages in Common Control Channels (not shown). In other systems, the tariff information can be conveyed through Paging Channel Messages (not shown). Broadcasting through common control channels is preferable because mobile radio stations, when being switched on, decode messages received on such common control channels. In case of different types of tariff messages, information conveyed in such messages is preferably stored in the memory 64 for retrieval. In the simplest form of the invention, wherein only a starting time and a future tariff change is indicated during a current tariff period, displaying such information on the display 70, e.g. in the form of a special icon or an alphanumeric message, accompanied with a beep, is sufficient to alert the subscriber of the tariff option.

Figure 4A:
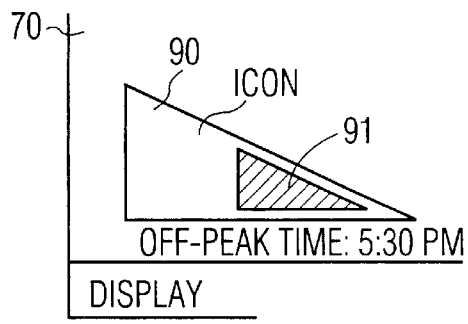
FIG. 4 is a icon on a display of the subscriber station for indicating off-peak free minutes.
Figure 4B:
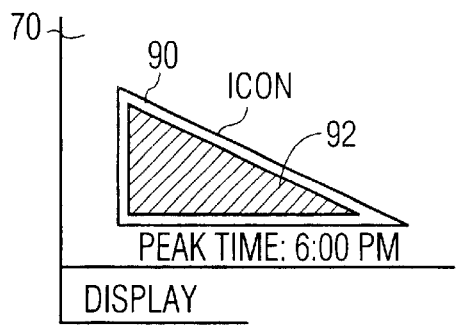

FIG. 4 is an icon on a display of the subscriber station for indicating off-peak free minutes. A triangular icon 90 contains an indicator 91 half-filling the icon 90 in a contrast-like way to indicate that a future off-peak free minute tariff period as indicated in the message 80 actually starts, and an indicator 92 completely filling the icon 90 to indicate a current peak-time period, i.e., the icon changes at actual starting times indicated in the message 80. In addition thereto, off-peak and peak-times may be displayed by an alphanumerical message below the icon 90.

Figure 5:
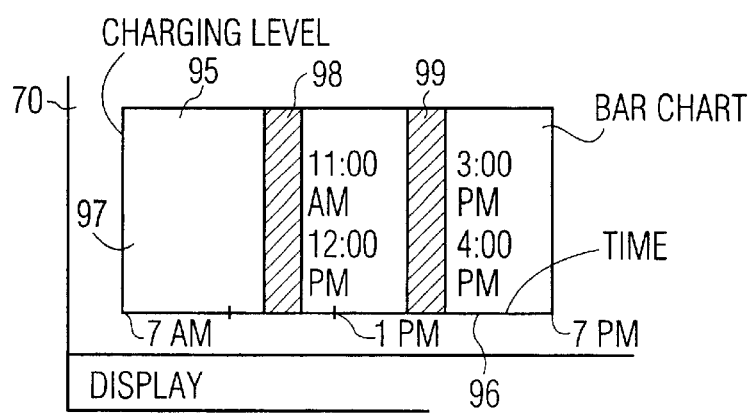
FIG. 5 is a bar chart on the display for indicating off-peak charge free minute periods.

FIG. 5 is a bar chart 95 on the display 70 for indicating off-peak charge free minute periods. In this embodiment, the message 80 is sent several times a day, or as a single message, possibly repeatedly broadcast, and indicates off-peak charge free minute periods. Subscribers still having off-peak time free minutes can take advantage of such messages. A first side 96 of the bar chart indicates time, in the example given a time period from 7 AM to 7 PM, a time period that is normally a peak period outside an off-peak period between 7 PM and 7 AM, and a second side 97 indicates a level of service charging tariffs. Off-peak time charge free minutes are indicated as bars 98 and 99 in inverse video, here from 11:00 AM to 12:00 PM and from 3:00 PM to 4:00 PM.

Figure 6:
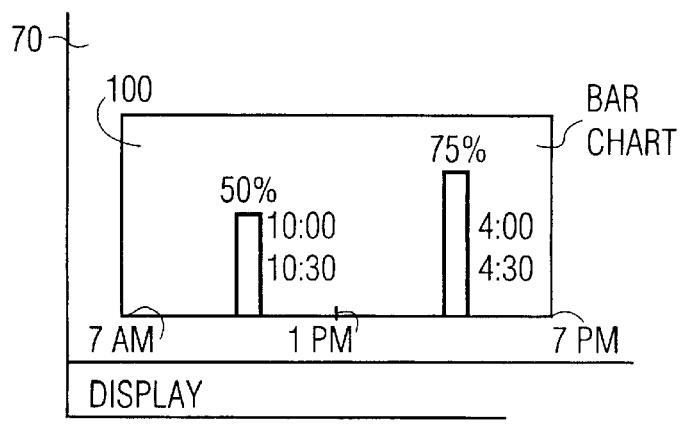
FIG. 6 is a bar chart on the display for indicating reduced peak charge minutes.

FIG. 6 is a bar chart 100 on the display 70 for indicating reduced peak charge minutes. Shown are reduced time periods, a 50% reduced peak time tariff from 10:00 AM to 10:30 AM, and a 75% reduced peak time tariff from 4:00 to 4:30 PM, in normal 30 highlighted video. The bar charts 95 and 100 may displayed as a combined bar chart showing both off-peak charge minute periods and reduced peak time periods.

In view of the foregoing it will be evident to a person skilled in the art that various modifications may be made within the spirit and scope of the invention as hereinafter defined by the appended claims and that the invention is thus not limited to the examples provided. The word "comprising" does not exclude the presence of other elements or steps than those listed in a claim.

What is claimed is:

1. A method for advising subscribers of a telecommunication system of service charging tariffs of services to said subscribers, said method comprising:

broadcasting at a current time when a current tariff in a current tariff period applies of service charging tariff message from said telecommunication system to said subscribers, said service charging tariff message comprising a scheduled starting time of a future tariff period and a tariff indication of said future tariff period, said tariff indication indicating a more favorable tariff than said current tariff and the starting time being strictly later than the current time wherein;

upon reception of said service charging tariff message, a subscribers station processes said starting time of said future tariff period and said tariff indication.

2. A method as claimed in claim 1, wherein said service charging tariff message further comprises an ending time of said future tariff period.

3. A method as claimed in claim 1, wherein said service charging tariff message comprises at least one further starting time of at least one further future tariff period and corresponding tariff indications.

4. A method as claimed in claim 1, wherein said service charging tariff message comprises service charging tariff information for a current day.

5. A method as claimed in claim 1, wherein said service charging tariff message further comprises.a date indicating on which day said starting time and future tariff period apply.

6. A method as claimed in claims 4 or 5, wherein said service charging tariff message is broadcast at irregular times throughout a day.

7. A method as claimed in claims 4 or 5, wherein said service charging tariff message is broadcast after an operator of said telecommunications system has updated the contents of said service charging tariff message, said contents reflecting a change in said tariff indication.

8. A method as claimed in claim 1, wherein said service is a data service and said future tariff period is less than five minutes.

9. A subscriber station for use in a telecommunication system, said subscriber station comprising:

means for receiving at a current time when a current tariff in a current tariff period applies a service charging tariff message from said telecommunication system, said service charging tariff message at least comprising a starting time, strictly later than the current time, of a future tariff period and a tariff indication of said future tariff period, said tariff indication indicating a more favorable tariff than said current tariff; and means for processing said service charging tariff message.

10. A subscriber station as claimed in claim 9, further comprising display means, wherein said means for processing retrieve said starting time of said future tariff period and said tariff indication from said service charging tariff message, and control said display means to display said starting time and said tariff indication.

11. A subscriber station as claimed in claim 9, further comprising storage means, wherein said means for processing retrieve said starting time of said future tariff period and said tariff indication from said service charging tariff message, and control said storage means to store said starting time and said tariff indication.

12. A subscriber station as claimed in claim 11, further comprising display means and a control key, wherein said starting time and tariff indication are retrieved from said storage means and are displayed by said display means, upon activation of said control key.

13. A subscriber station as claimed in claim 9, wherein said service charging tariff message further comprises an ending time of said future tariff period.

14. A subscriber station as claimed in claims 10 or 12, wherein tariff information comprised in said service charging tariff message is displayed in the form of a icon such that information as regards lower tariffs is differentiated from information as regards higher tariffs.

15. A subscriber station as claimed in claim 14, wherein said icon has the form of a bar chart of which a first side indicates time and a second side indicates a level of service charging tariffs.

16. A subscriber station as claimed in claim 15, wherein said tariff indication indicates off-peak charge free minutes and said display is controlled such that time periods of said off-peak charge free minutes are displayed as bars in inverse-video, said bars extending over a full length of said second side within said bar chart.

17. A subscriber station as claimed in claim 15, wherein said tariff indication indicates reduced peak charge minutes and said display is controlled such that time periods of said reduced peak charge minutes are displayed as further bars in normal, highlighted video, said further bars extending over a length along said side within said bar chart in proportion to charging tariffs of said reduced peak charge minutes.

18. A subscriber station as claimed in claims 10 or 12, wherein tariff information.comprised in said service charging tariff message comprises off-peak free minute periods, a current off-peak free minute period being displayed in the form of a triangular icon such that an off-peak free minute period is distinguished from a peak time period.

19. A subscriber station as claimed in claim 9, wherein said starting time and said tariff indication have the form of a free-format alphanumerical message.

* * * * *